US006570913B1

(12) United States Patent
Chen (10) Patent No.: US 6,570,913 B1
(45) Date of Patent: May 27, 2003

(54) METHOD AND APPARATUS FOR SELECTING OPTIMUM FREQUENCY FOR UPSTREAM DATA TRANSMISSION IN A NETWORK SYSTEM UTILIZING CABLE MODEMS

(75) Inventor: Wei-Sing Chen, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/286,202

(22) Filed: Apr. 5, 1999

(51) Int. Cl.[7] ................................................. H04B 1/38
(52) U.S. Cl. ......................... 375/223; 375/222; 455/5.1; 348/13
(58) Field of Search ................................. 375/220, 221, 375/222, 223, 302, 271; 455/557, 5.1, 71, 76; 370/278, 282; 348/11, 12, 13, 193

(56) References Cited

U.S. PATENT DOCUMENTS

| 4,665,494 A | 5/1987 | Tanaka et al. |
| 5,225,902 A | 7/1993 | McMullan, Jr. |
| 5,488,412 A | 1/1996 | Majeti et al. ................. 348/10 |
| 5,586,121 A | 12/1996 | Moura et al. ............... 370/404 |

(List continued on next page.)

OTHER PUBLICATIONS

Naegeli, et al., "Method and Apparatus for Using a Spectrum Analyzer for Locating Ingress Noise Gaps", Cisco Technology, Inc., U.S. Application No. 08/993,334, filed Dec. 19, 1997, pp. 1–44.

Wavetek®, "RP100 Return Path Monitoring System", *Product Brochure*, (1997).

Ulm, et al., "Data–Over–Cable Service Interface Specification", *Radio Frequency Interface Specification, No. 102–971008*, (1997).

ANSI®, Carrier–to–Customer Installation–DS1 Metallic Interface, *American National Standard for Telecommunications*, T1.403 (1989).

Rogers Engineering, Two-Way CATV Plant Characterization Test Procedures, *Test Procedures for Two-Way CATV Plant Characterization*, p. 8 (1993).

R.P.C. Wolters, "Characteristics of Upstream Channel Noise in CATV–Networks", *IEEE Transactions of Broadcasting*, vol. 42, No. 4, pp. 328–332 (1996).

Naegeli et al., "Method and Apparatus for Locating a Cleaner Bandwidth in a Frequency Channel for Data Transmission", Cisco Technology, U.S. Application No. 09/227,991, filed Jan. 8, 1999, pp. 1–46.

*Primary Examiner*—Emmanuel Bayard
(74) *Attorney, Agent, or Firm*—Beyer Weaver & Thomas LLP (57) ABSTRACT

Provided are methods and apparatuses for quickly and efficiently locating a frequency band for upstream transmission of data in a data communications network system utilizing cable modems. In a preferred embodiment, a cable modem termination system (CMTS) at the headend performs a lookahead in order to determine the noise power spectrum allocated to its upstream channels. Free bands (noise-free bands available for upstream data transmission) may then be determined based on the noise power spectrum and the upstream channel capacity requirements according to a process that is preferably implemented in computer code at the headend. The lookahead is preferably accomplished by using a spectrum analyzer, which is preferably incorporated into the CMTS at the headend, to collect a table of samples of the noise power versus frequency. This table of samples is input to a computational algorithm which determines free band sets for one or more preferred modulation formats rapidly and efficiently in software without the stepping of the upstream receiver frequency as in the blind frequency hop process. Once a band has been located, the CMTS assigns its frequency to an upstream channel and signals the cable modem of the frequency update.

38 Claims, 9 Drawing Sheets

U.S. PATENT DOCUMENTS

| | | |
|---|---|---|
| 5,631,846 A | 5/1997 | Szurkowski |
| 5,729,824 A | 3/1998 | O'Neil et al. |
| RE35,774 E | 4/1998 | Moura et al. ................. 348/12 |
| 5,767,895 A * | 6/1998 | Yashiro et al. ............. 725/106 |
| 5,790,523 A | 8/1998 | Ritche et al. |
| 5,818,845 A | 10/1998 | Moura et al. ............... 370/449 |
| 5,828,655 A | 10/1998 | Moura et al. ............... 370/236 |
| 5,859,852 A | 1/1999 | Moura et al. ............... 370/449 |
| 5,862,451 A | 1/1999 | Grau et al. |
| 5,939,887 A | 8/1999 | Schmidt et al. |
| 5,943,604 A | 8/1999 | Chen et al. |
| 5,946,047 A | 8/1999 | Levan ........................ 348/473 |
| 5,946,048 A | 8/1999 | Levan ........................ 348/473 |
| 5,956,346 A | 9/1999 | Levan ........................ 370/480 |
| 5,959,660 A | 9/1999 | Levan ......................... 348/12 |
| 5,959,997 A | 9/1999 | Moura et al. ............... 370/404 |
| 6,032,019 A | 2/2000 | Chen et al. |
| 6,041,340 A | 3/2000 | Mintzer |
| 6,094,211 A | 6/2000 | Baran et al. |
| 6,281,829 B1 * | 8/2001 | Amrany et al. ............. 341/155 |
| 6,321,384 B1 * | 11/2001 | Eldering .................... 725/125 |
| 6,370,153 B1 * | 4/2002 | Eng ........................... 370/438 |

* cited by examiner

METHOD AND APPARATUS FOR SELECTING OPTIMUM FREQUENCY FOR UPSTREAM DATA TRANSMISSION IN A NETWORK SYSTEM UTILIZING CABLE MODEMS

BACKGROUND OF THE INVENTION

The present invention relates generally to methods and apparatus for transmitting digital data in network system utilizing cable modems. More specifically, the present invention relates to methods and apparatus for quickly and efficiently locating upstream data channels substantially free of ingress noise or other interference in network systems utilizing cable modems.

The cable TV industry has been upgrading its signal distribution and transmission infrastructure since the late 1980s. In many cable television markets, the infrastructure and topology of cable TV systems now include fiber optics as part of its signal transmission component. This has accelerated the pace at which the cable industry has taken advantage of the inherent two-way communication capability of cable systems. The cable industry is now poised to develop reliable and efficient two-way transmission of digital data over its cable lines at speeds orders of magnitude faster than those available through telephone lines, thereby allowing its subscribers to access digital data for uses ranging from Internet access to cablecommuting.

Originally, cable TV lines were exclusively coaxial cable. The system included a cable headend, ie. a distribution hub, which received analog signals for broadcast from various sources such as satellites, broadcast transmissions, or local TV studios. Coaxial cable from the headend was connected to multiple distribution nodes, each of which could supply many houses or subscribers. From the distribution nodes, trunk lines (linear sections of coaxial cable) extended toward remote sites on the cable network. A typical trunk line is about 10 kilometers long. Branching off of these trunk lines were distribution or feeder cables (40% of the system's cable footage) to specific neighborhoods, and drop cables (45% of the system's cable footage) to homes receiving cable television. Amplifiers are provided to maintain signal strength at various locations along the trunk line. For example, broadband amplifiers are required about every 2000 feet depending on the bandwidth of the system. The maximum number of amplifiers that can be placed in a run or cascade is limited by the build-up of noise and distortion. This configuration, known as tree and branch, is still present in older segments of the cable TV market.

With cable television, a TV analog signal received at the headend of a particular cable system is broadcast to all subscribers on that cable system. The subscriber simply needed a television with an appropriate cable receptor to receive the cable television signal. The cable TV signal was broadcast at a radio frequency range of about 50 to 800 MHz. Broadcast signals were sent downstream; that is, from the headend of the cable system across the distribution nodes, over the trunk line, to feeder lines that led to the subscribers. However, the cable system did not have installed the equipment necessary for sending signals from subscribers to the headend, known as return or upstream signal transmission. Not surprisingly, nor were there provisions for digital signal transmission either downstream or upstream.

In the 1980s, cable companies began installing optical fibers between the headend of the cable system and distribution nodes (discussed in greater detail with respect to FIG. 1 below). The optical fibers reduced noise, improved speed and bandwidth, and reduced the need for amplification of signals along the cable lines. In many locations, cable companies installed optical fibers for both downstream and upstream signals. The resulting systems are known as hybrid fiber-coaxial (HFC) systems. Upstream signal transmission was made possible through the use of duplex or two-way filters. These filters allow signals of certain frequencies to go in one direction and of other frequencies to go in the opposite direction. This new upstream data transmission capability allowed cable companies to use set-top cable boxes and allowed subscribers pay-per-view functionality, ie. a service allowing subscribers to send a signal to the cable system indicating that they want to see a certain program.

In addition, cable companies began installing fiber optic lines into the trunk lines of the cable system in the late 1980s. A typical fiber optic trunk line can be up to 80 kilometers long, whereas a typical coaxial trunk line is about 10 kilometers long as mentioned above. Prior to the 1990s, cable television systems were not intended to be general-purpose communications mechanisms. Their primary purpose was transmitting a variety of television signals to subscribers. Thus, they needed to be one-way transmission paths from a central location, known as the headend, to each subscriber's home, delivering essentially the same signals to each subscriber. HFC systems run fiber deep into the cable TV network offering subscribers more neighborhood specific programming by segmenting an existing system into individual serving areas between 100 to 2,000 subscribers. Although networks exclusively using fiber optics would be optimal, presently cable networks equipped with HFC configurations are capable of delivering a variety of high bandwidth, interactive services to homes for significantly lower costs than networks using only fiber optic cables.

Figure 1:
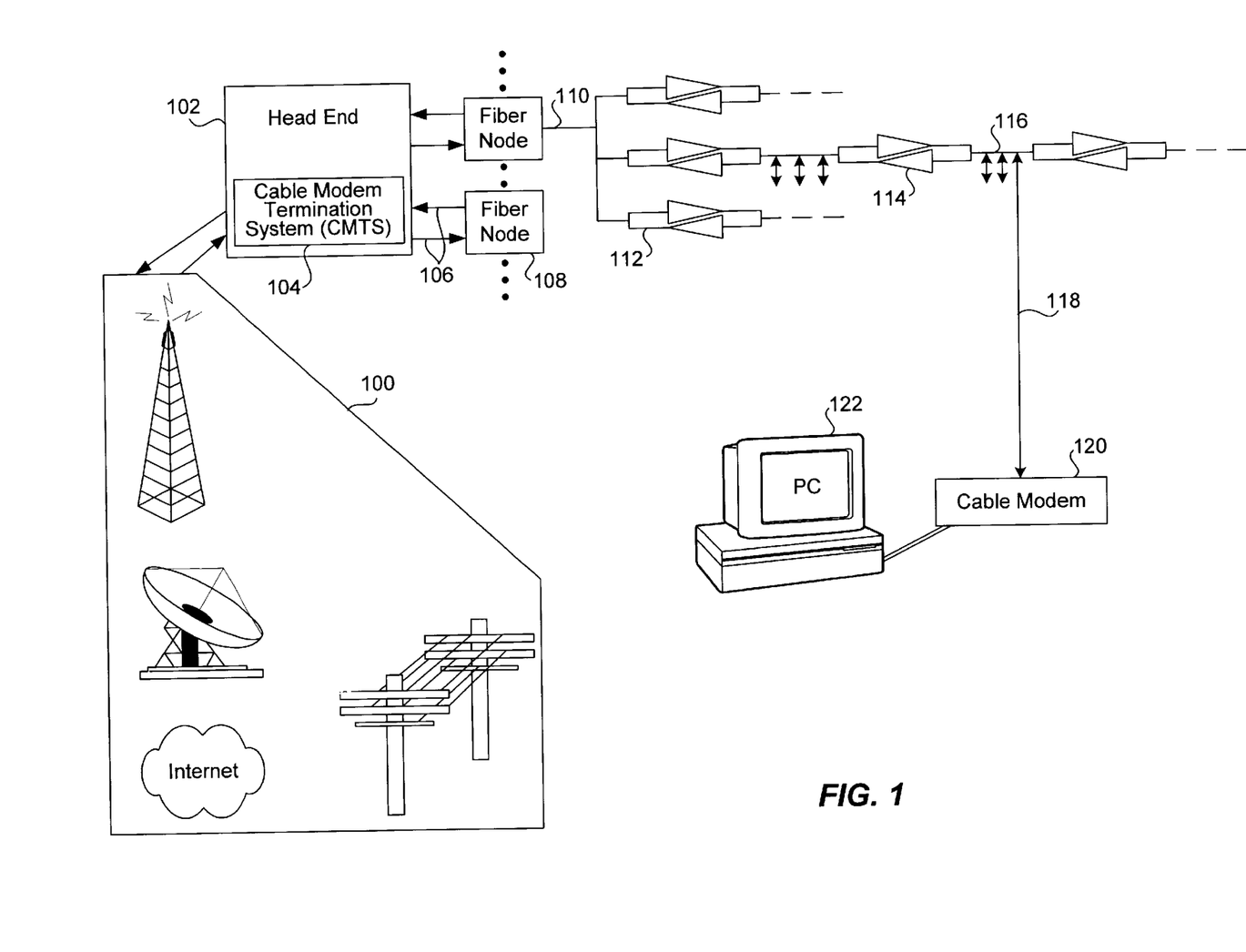
FIG. 1 is a block diagram of a two-way HFC cable system utilizing a cable modem for data transmission.

FIG. 1 is a block diagram of a two-way HFC cable system utilizing a cable modem for data transmission. It shows a headend 102 (essentially a distribution hub) which can typically service about 40,000 subscribers. Headend 102 contains a cable modem termination system (CMTS) 104 that is needed when transmitting and receiving data using cable modems. CMTS 104 is discussed in greater detail with respect to FIG. 2. Headend 102 is connected through pairs of fiber optic lines 106 (one line for each direction) to a series of fiber nodes 108. Each headend can support normally up to 80 fiber nodes.

Pre-HFC cable systems used coaxial cables and conventional distribution nodes. Since a single coaxial cable was capable of transmitting data in both directions, one coaxial cable ran between the headend and each distribution node. In addition, because cable modems were not used, the headend of pre-HFC cable systems did not contain a CMTS. Each of the fiber nodes 108 is connected by a coaxial cable 110 to duplex filters 112 which permit certain frequencies to go in one direction and other frequencies to go in the opposite direction (frequency ranges for upstream and downstream paths are discussed below). Each fiber node 108 can normally service up to 500 subscribers, depending on the bandwidth. Fiber node 108, coaxial cable 110, two-way amplifiers 112, plus distribution amplifiers 114 along trunk line 116, and subscriber taps, i.e. branch lines 118, make up the coaxial distribution system of an HFC system. Subscriber tap 118 is connected to a cable modem 120. Cable modem 120 is, in turn, connected to a subscriber computer 122.

Recently, it has been contemplated that HFC cable systems could be used for two-way transmission of digital data.

The data may be Internet data, digital audio data, or digital video data, in MPEG format, for example, from one or more external sources 100. Using two-way HFC cable systems for transmitting digital data is attractive for a number of reasons. Most notably, they provide up to a thousand times faster transmission of digital data than is presently possible over telephone lines. However, in order for a two-way cable system to provide digital communications, subscribers must be equipped with cable modems, such as cable modem 120. With respect to Internet data, the public telephone network has been used, for the most part, to access the Internet from remote locations. Through telephone lines, data is typically transmitted at speeds ranging from 2,400 to 56,600 bits per second (bps) using commercial (and widely used) data modems for personal computers. Using a two-way HFC system as shown in FIG. 1 with cable modems, data may be transferred at speeds of 10 million bps, or more. Table 1 is a comparison of transmission times for transmitting a 500 kilobyte image over the Internet.

TABLE 1

Time to Transmit a Single 500 Kbytes Image

| Telephone Modem (28.8 kbps) | 6–8 minutes |
| ISDN Line (64 kbps) | 1–1.5 minutes |
| Cable Modem (10 Mbps) | 1 second or less |

Furthermore, subscribers can be fully connected twenty-four hours a day to services without interfering with cable television service or phone service. The cable modem, an improvement of a conventional PC data modem, provides this high speed connectivity and is, therefore, instrumental in transforming the cable system into a full service provider of video, voice and data telecommunications services.

As mentioned above, the cable industry has been upgrading its coaxial cable systems to HFC systems that utilize fiber optics to connect headends to fiber nodes and, in some instances, to also use them in the trunk lines of the coaxial distribution system. In way of background, optical fiber is constructed from thin strands of glass that carry signals longer distances and have a wider bandwidth than either coaxial cable or the twisted pair copper wire used by telephone companies. Fiber optic lines allow signals to be carried much greater distances without the use of amplifiers (item 114 of FIG. 1). Amplifiers degrade the signal quality and are susceptible to high maintenance costs. Thus, coaxial distribution systems that use fiber optics have much less need for amplifiers. In addition, amplifiers are typically not needed for fiber optic lines (item 106 of FIG. 1) connecting the headend to the fiber nodes.

In cable systems, digital data is carried over radio frequency (RF) carrier signals. Cable modems are devices that convert digital data to a modulated RF signal and converts the RF signal back to digital form. The conversion is done at two points: at the subscriber's home by a cable modem and at a CMTS located at the headend. The CMTS converts the digital data to a modulated RF signal which is carried over the fiber and coaxial lines to the subscriber premises. The cable modem then demodulates the RF signal and feeds the digital data to a computer. On the return path, the operations are reversed. The digital data is fed to the cable modem which converts it to a modulated RF signal (it is helpful to keep in mind that the word "modem" is derived from modulator/demodulator). Once the CMTS receives the RF signal, it demodulates it and transmits the digital data to an external source.

As mentioned above, cable modem technology is in a unique position to meet the demands of users seeking fast access to information services, the Internet and business applications, and can be used by those interested in cable-commuting (a group of workers working from home or remote sites whose numbers will grow as the cable modem infrastructure becomes increasingly prevalent). Not surprisingly, with the growing interest in receiving data over cable network systems, there has been increased focus on performance, reliability, and improved maintenance of such systems. In sum, cable companies are in the midst of a transition from their traditional core business of entertainment video programming to a position as full service providers of video, voice and data telecommunication services. Among the elements that have made this transition possible are technologies such as the cable modem.

A problem common to all upstream data transmission on cable systems, i.e. transmissions from the cable modem in the home back to the headend, is ingress noise which lowers the signal-to-noise ratio, also referred to as carrier-to-noise ratio of an upstream channel. Ingress noise can result from numerous internal and external sources. Sources of noise internal to the cable system may include cable television network equipment, subscriber terminals (televisions, VCRs, cable modems, etc.), intermodular signals resulting from corroded cable termini, and core connections. Significant sources of noise external to the cable system include home appliances, welding machines, automobile ignition systems, and radio broadcasts, e.g. citizen band and ham radio transmissions. All of these ingress noise sources enter the cable system over the coaxial cable line, which acts essentially as a long antenna. Ultimately, when cable systems are entirely optical fiber, ingress noise will be a far less significant problem. However, until that time, ingress noise is and will continue to be a problem with upstream transmissions.

The portion of bandwidth reserved for upstream signals is normally in the 5 to 42 MHz range. Some of this frequency band may be allocated for set-top boxes, pay-pre-view, and other services provided over the cable system. Thus, a cable modem may only be entitled to some fraction or "sub-band" such as between 200 kHz to 3.2 MHz. This sub-band is referred to as its "allotted band slice" of the entire upstream frequency range (5 to 42 MHz). This portion of the spectrum—from 5 to 42 MHz—is particularly subject to ingress noise and other types of interference. Thus, cable systems offering two-way data services must be designed to operate given these conditions.

An emerging standard establishing the protocol for two-way communication of digital data on cable systems has been defined by a consortium of industry groups. The protocol, known as the Data Over Cable System Interface Specification (DOCSIS), specifies particular standards regarding the transmission of data over cable systems. With regard to the sub-band mentioned above, DOCSIS specifies that the bandwidth of a data carrier should generally be 200 KHz to 3.2 MHz. Further references to DOCSIS standards will be made in the specification.

As noted above, ingress noise, typically narrow band, e.g., below 100 kHz, is a general noise pattern found in cable systems. Upstream channel noise resulting from ingress noise adversely impacts upstream data transmission by reducing data throughput and interrupting service, thereby adversely affecting performance and efficient maintenance. One strategy to deal with cable modem ingress noise is to position the modem's upstream data carrier in an ingress noise gap where ingress noise is determined to be low, such as between radio transmission bands. The goal is to position data carriers to avoid already allocated areas.

Ingress noise varies with time, but tends to accumulate over the system and is measured at the headend (ingress noise is uniform over the entire wire). In addition, while a particular frequency band may have been appropriate for upstream transmissions at the beginning of a transmission, it may later be unacceptably noisy for carrying a signal. Therefore, a cable system must attempt to identify noisy frequency bands and locate optimal or better bands for upstream transmission of data at a given time.

Block 104 of FIG. 1 represents a cable modem termination system connected to a fiber node 108 by pairs of optical fibers 106. The primary functions of the CMTS are (1) receiving signals from external sources 100 and converting the format of those signals, e.g., microwave signals to electrical signals suitable for transmission over the cable system; (2) providing appropriate media access control level packet headers for data received by the cable system, (3) modulating and demodulating the data to and from the cable system, and (4) converting the electrical signal in the CMTS to an optical signal for transmission over the optical lines to the fiber nodes.

Figure 2:
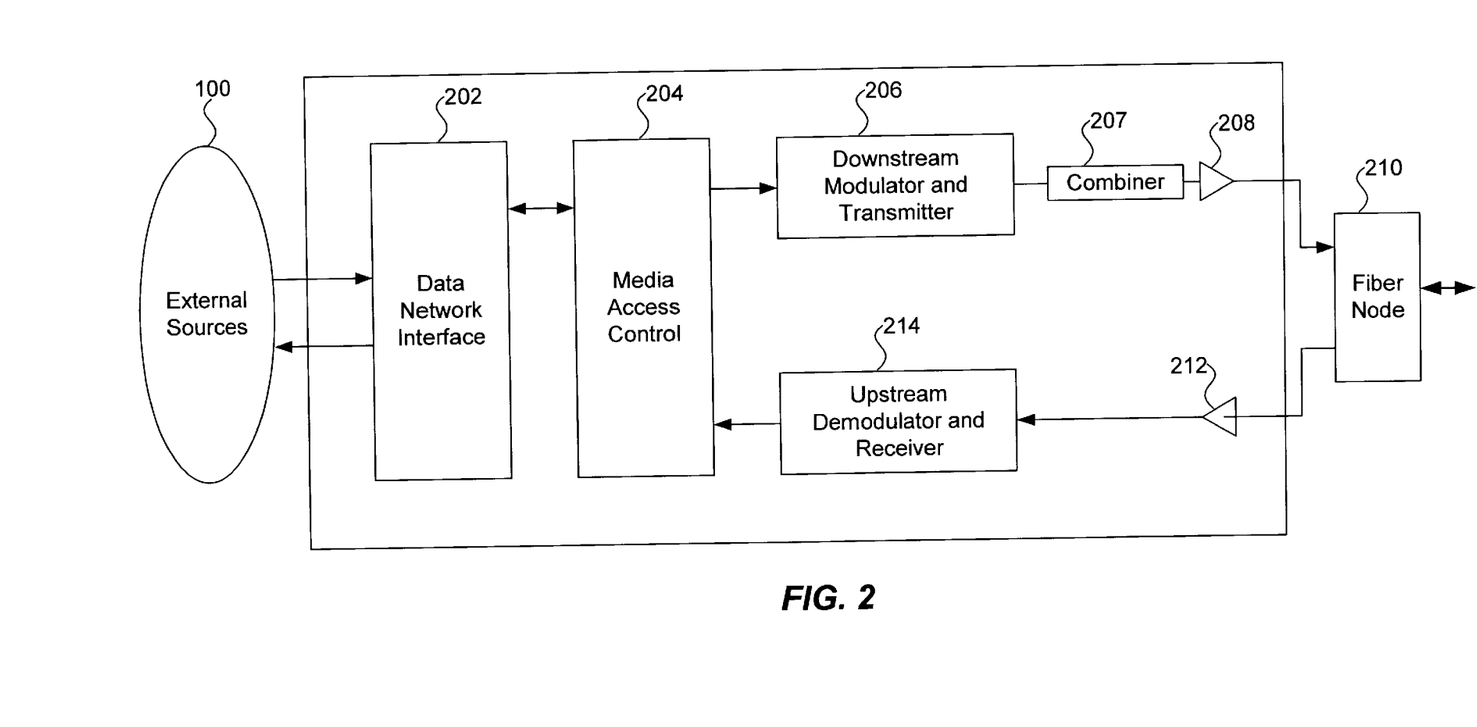
FIG. 2 is a block diagram showing the basic components of a cable modem termination system.

FIG. 2 is a block diagram showing the basic components of a cable modem termination system (item 104 of FIG. 1). Data Network Interface 202 is an interface component between external data sources and the cable system. External data sources (item 100 of FIG. 1) transmit data to data network interface 202 via optical fiber, microwave link, satellite link, or through various other media. A Media Access Control Block (MAC Block) 204 receives data packets from Data Network Interface 202. Its primary purpose is to encapsulate the data packets with a MAC headers containing cable modem addresses according to the MCNS standard. A MAC address is necessary to distinguish data from the cable modems since all the modems share a common upstream path, and so that the system knows where to send data. Thus, data packets, regardless of format, must be mapped to a particular MAC address.

MAC block 204 transmits data via a one-way communication medium to a downstream modulator and transmitter 206. Downstream modulator and transmitter 206 takes the data in a packet structure and modulates it on the downstream carrier using, for example, QAM (Quadrature Amplitude Modulation)-64 modulation (other modulation techniques can be used, such as CDMA (Code Division Multiple Access), OFDM {Orthogonal Frequency Division Multiplexing}, and FSK (FREQ Shift Keying)). The return data is likewise modulated using, for example, QAM-16 or QSPK. These modulation techniques methods are well-known in the art.

QAM-16 transmits using a 4-bit symbol, and requires a relatively high signal-to-noise ratio to work such as about 25 dB. QPSK (Quadrature Phase Shift Keying), on the other hand, used for demodulating the upstream data, transmits using only a 2-bit symbol, but does not require as high a signal-to-noise ratio, and can work at around 15 dB. QPSK is also less expensive and requires less processing than QAM-16. The downstream data path is considered less hostile to the signal and sends data at a very high rate, typically using QAM-64 modulation. The data carried upstream, however, is more susceptible to noise and typically requires a more robust format, such as QAM-16 or QPSK.

It should be noted that optical fibers transmit data in one direction per wavelength and coaxial cables can transmit data in two directions. Thus, there generally is only one coaxial cable leaving the fiber node which is used to send and receive data, whereas there are two optical fiber lines or wave guide from the fiber node to the downstream and upstream modulators.

Downstream Modulator and Transmitter 206 converts the digital data packets to modulated downstream RF frames, such as MPEG or ATM frames, using quadrature amplitude modulation, e.g. QAM-64, forward error correcting (FEC) code, and packet interleaving. Data from other services, such as television, is added at a combiner 207. Converter 208 converts the modulated RF electrical signals to optical signals that can be received and transmitted by a Fiber Node 210. Each Fiber Node 210 can generally service about 500 subscribers depending on bandwidth. Converter 212 converts optical signals transmitted by Fiber Node 210 to electrical signals that can be processed by an Upstream Demodulator and Receiver 214. This component demodulates the upstream RF signal (in the 5–42 MHz range) using, for example, QAM-16 or QPSK. It then sends the digital data to MAC 204.

One method of locating better channels for the upstream data carrier (ingress noise mitigation) is manually monitoring a particular channel and gathering historical data with respect to the noise level on that channel over a certain period of time. The historical data is then used to compile statistics regarding noise level change on that channel. This requires that an engineer or other human operator monitor and gather the data manually to compile the statistics regarding noise on the channel. This method presumes that the noise level on a channel is "regular" and can be predicted if sufficient statistics are compiled. Even after this process is automated to some degree in terms of monitoring and data gathering, it assumes that the noise on a channel has a pattern that can be detected. This a faulty and unjustifiable assumption. In reality, the noise level on all channels are random and chaotic. Specifically, if multiple periodic, yet independent, functions drive a single system, its measured output has a chaotic output function. Furthermore, even if it were possible to extract some degree of regularity in noise patterns, this process is cumbersome, expensive, and requires a high degree of human intervention.

Another method, closely related, involves using a device for gathering data and processing statistics one frequency at a time. The device essentially accumulates data, hashes it, and derives statistics using probability functions. Once it finds a low-noise channel, the system changes its upstream carrier to that channel. However, the time between determining a potentially lower noise channel and using that channel is in the range of minutes to hours. Consequently, the data is likely outdated by the time the system uses it for locating an upstream data carrier.

Both of these methods assume that the cable system is relatively static. However, it is evident that noise in the cable system is far more chaotic in nature than static. There are hundreds of sources of noise that can interfere with the carrier-to-noise ratio of the upstream data. For example, time, weather, temperature, electrical conductivity in the atmosphere, people's habits, and other disparate factors can contribute to ingress noise on an upstream data carrier.

Frequency hopping is another technique used in DOCSIS cable modems for avoiding noise, particularly narrow band ingress noise. With frequency hopping, the frequency (channel) of a data carrier, but not its symbol rate or modulation, is changed to avoid an interfering carrier. Frequency hopping may be conducted without performing "lookahead," that is, without analyzing the available frequencies before changing the frequency of the data carrier.

This technique is termed "blind frequency hop." Blind frequency hop does not require additional hardware. The carrier frequency is sequentially changed according to a pre-established channelization table or formula until the channel is restored to acceptable noise levels. In the latter case, this often consists of a starting frequency and step size. If the noise-free spectrum does not fit the preestablished table or formula, then there is a reduced chance of fitting data carriers in those regions. Consequently, the rate of transmission errors may not be optimally minimized or may remain at excessively high levels.

Blind frequency hop may be modified with "microadjustments" in the channelization table or formula to accomplish better data carrier fit (i.e., to locate sufficiently wide bands for data transmission between regions of narrow band ingress noise). This modification means that he step size is reduced. Microadjustment provides improved fit (more efficient use of the available frequencies) between noise ingress gaps, but at the expense of an increase in search steps, since many more blind microadjustment hops than full channel hops (such as are performed in blind channel hopping) are required to cover the same range of available frequencies. Thus, microadjustment slows the process of locating an appropriate upstream data transmission band.

Therefore, what is needed is a reliable and efficient method of locating channels for upstream data carriers that have low noise levels, thereby enabling deliberate and intelligent selection of an upstream data carrier in a network system utilizing cable modems.

SUMMARY OF THE INVENTION

To achieve the foregoing, the present invention provides methods and apparatuses for quickly and efficiently locating a frequency band for upstream transmission of data in a data communications network system utilizing cable modems. In a preferred embodiment, a cable modem termination system (CMTS) at the headend performs a lookahead in order to determine the noise power spectrum allocated to its upstream channels. Free bands (noise-free bands available for upstream data transmission) may then be determined based on the noise power spectrum and the upstream channel capacity requirements according to a process that is preferably implemented in computer code at the headend. The lookahead is preferably accomplished by using a spectrum analyzer, which is preferably incorporated into the CMTS at the headend, to collect a table of samples of the noise power versus frequency. This table of samples is input to a computational algorithm which determines free band sets for one or more preferred modulation formats rapidly and efficiently in software without the stepping of the upstream receiver frequency as in the blind frequency hop process. Once a band has been located, the CMTS assigns its frequency to an upstream channel and signals the cable modem of the frequency update.

In one aspect, the present invention provides a method of selecting an upstream data transmission frequency band in a network system utilizing cable modems. The method involves sampling noise power for a set of allocated upstream data transmission frequency bands when there is no data transmission. A set of noise bands is determined within the allocated frequency bands, the noise bands being bands in which noise exceeds a reliable transmission threshold for a modulation format. A set of free bands is determined within the allocated frequency bands, the free band set being the set difference of the allocated bands and the noise bands. A first-fit is then performed on the free bands for a channel to be transmitted in order to select an upstream data transmission frequency band having capacity for that channel.

In other aspects, the invention also provides a computer program product including a computer-usable medium having computer-readable program code embodied thereon relating to selecting an upstream data transmission frequency band in a network system utilizing cable modems, the computer-readable program code effecting steps for accomplishing a method in accordance with the present invention. Network systems utilizing cable modems capable of two-way transmission of data, and cable television system headends incorporating cable modem termination systems capable of receiving and implementing such computer-readable program code are also provided.

These and other features and advantages of the present invention may be realized by reference to the remaining portions of the specification and the accompanying figures which illustrate by way of example principles of the invention.

DETAILED DESCRIPTION OF THE PREFERRED EMBODIMENTS

Reference will now be made in detail to a preferred embodiment of the invention. An example of the preferred embodiment is illustrated in the a accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Important issues regarding the expansion of the existing cable television system infrastructure to include full service two-way communication of digital data are reliability, low maintenance, and data integrity. The service must have low maintenance costs and must not alter data unintentionally during transmission. High data integrity is extremely important to most users. One way data is affected during transmission is by ingress noise, particularly on the upstream data path. As discussed above, present methods for locating an acceptable upstream data channel make inefficient use of available frequency bands and/or are slow.

Introduction the present invention provides methods and apparatuses for quickly and efficiently locating a frequency band for upstream transmission of data in a data communications network system utilizing cable modems. In a preferred embodiment, a cable modem termination system (CMTS) at the headend performs a lookahead in order to determine the noise power spectrum allocated to its upstream channels. Free bands (noise-free bands available for upstream data transmission) may then be determined based on the noise power spectrum and the upstream channel capacity requirements according to a process that is preferably implemented in computer code at the headend. The lookahead is preferably accomplished by using a spectrum analyzer, which is preferably incorporated into the CMTS at the headend, to collect a table of samples of the noise power versus frequency. This table of samples is input to a computational algorithm which determines free band sets for one or more preferred modulation formats rapidly and efficiently in software without the stepping of the upstream receiver frequency as in the blind frequency hop process. Once a band has been located, the CMTS assigns its frequency to an upstream channel and signals the cable modem of the frequency update.

As noted above, the present invention is preferably implemented through computer software running at the headend of a network system utilizing cable modems (e.g., a DOCSIS system). The hardware and software components of the present invention are described with reference to preferred embodiments below.

Figure 3A:
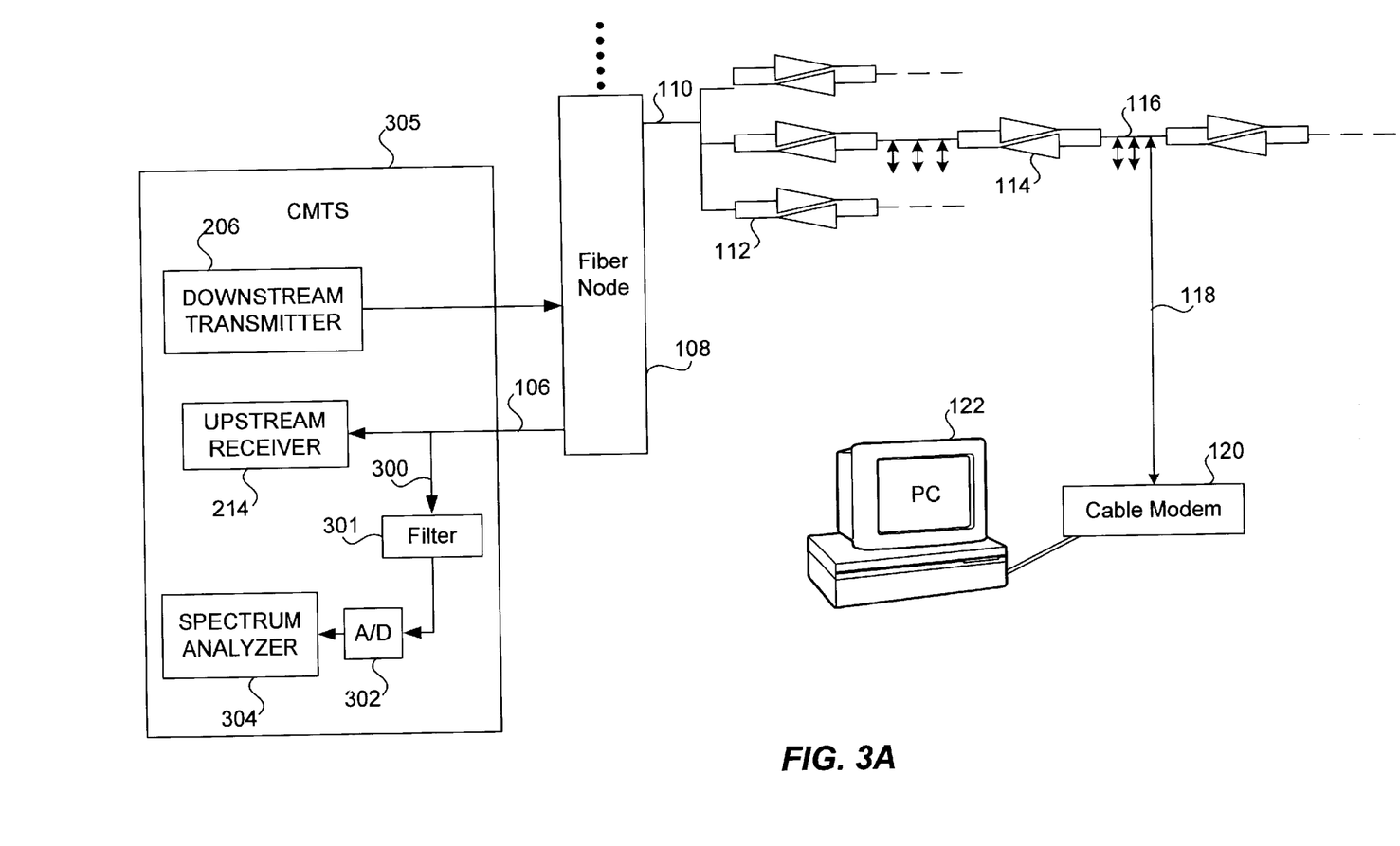
FIG. 3A is a block diagram of a cable plant showing the placement of a spectrum analyzer in accordance with a preferred embodiment of the present invention.

FIG. 3A is a block diagram of a cable plant showing the placement of a spectrum analyzer (also referred to as a spectrum manager) in a preferred embodiment of the present invention. A data carrier 300 is shown tapping cable line 106 which leads directly to the upstream receiver 214. The analog data is passed through an anti-alias filter 301, which essentially acts as a low-pass filter. Filter 301 cuts off or filters frequencies higher than 42 MHz, or some other predetermined upper frequency limit. An analog/digital converter 302 digitizes the radio frequency signals and feeds the digitized upstream data to a spectrum analyzer 304 located within the CMTS 305 in a preferred embodiment. The digital upstream data is not diverted from reaching the upstream receiver (it is essential that receiver 214 always be fed the upstream data for two-way data transmission to function), rather, the data is received by both units. The energy of each data stream (one to the upstream receiver and one to the spectrum manager) is half of the total energy of the incoming upstream data. In another preferred embodiment, the spectrum analyzer 304 can be located on the upstream data path outside the headend. Regardless of where spectrum analyzer 304 is located, it accumulates data for further analysis by a central processing unit (CPU).

Figure 3B:
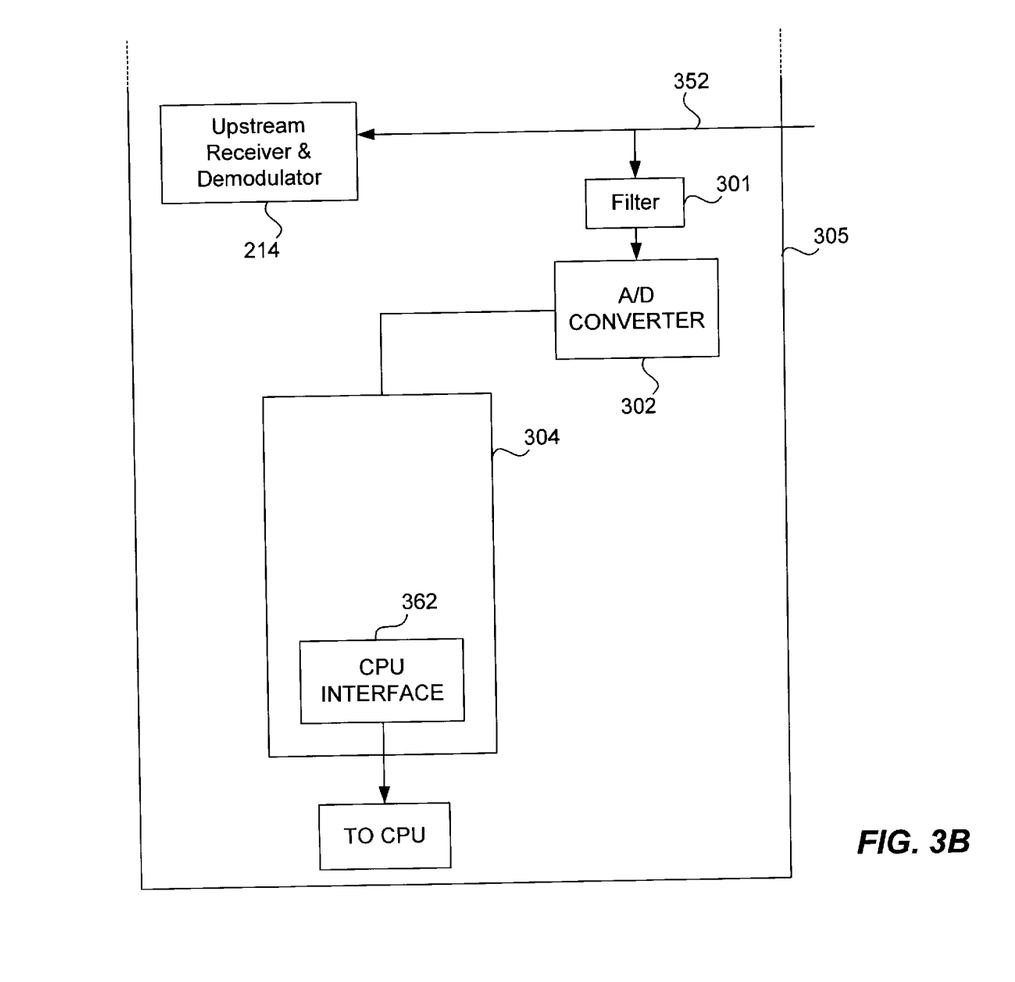
FIG. 3B shows an expanded view of the environment of the spectrum analyzer in a CMTS in accordance with a preferred embodiment of the present invention.

FIG. 3B shows an expanded view of the environment of the spectrum analyzer 304 in the CMTS 305 in accordance with a preferred embodiment of the present invention. In a preferred embodiment, the spectrum analyzer 304 scans the entire upstream spectrum from 5–42 MHz using a 512-point sample size at a sample rate of 100 Msamples per second. The sample is taken at an instant when there are no upstream data transmissions. Upstream radio frequency signals 352 enter the CMTS 305 and are fed to spectrum analyzer 304 and to the upstream receiver 214. The power samples are transformed by the CMTS circuitry, for example, using a 512-point FFT to convert the time domain plot to a frequency domain plot, as illustrated below with reference to FIGS. 4A–C and 5A–C. Once the data is processed in the CMTS 305, the data can be accessed by a CPU (not shown), which may be a computer network device, through a CPU interface 362. The CPU determines which frequency band is available for the upstream data carrier according to method of the present invention based on the data provided by the CMTS 305.

Generally, the technique of the present invention is implemented in the computer code (software) of a CMTS or in the computer code of an external apparatus controlling the CMTS. In a preferred embodiment, a CPU interfaced with the CMTS via CPU interface 362 is also responsible for controlling the CMTS in its various data collection and processing functions. It preferably accomplishes all these functions under the control of software including an operating system (e.g., the Internetwork Operating System (IOS®) of Cisco Systems, Inc.) and the software for implementing the optimum frequency selection method of the present invention. The interface 362 between the CMTS and the CPU is preferably provided as an interface card (sometimes referred to as a "line card"). The CMTS also contains a spectrum analyzer 304 controlled by a software driver which is a portion of the CPU code. The software driver code delivers samples of the upstream power spectrum to the optimum frequency selection method of the present invention for use in managing the upstream channel frequency, modulation, and symbol rate.

The computer software for implementing the optimum frequency selection method of the present invention may be run, and its program instructions provided to the headend hardware for implementation, in any way known and used in the art. In the embodiment illustrated in FIG. 3B, the software is run on the CPU and the spectrum analyzer 304 is controlled via the CPU interface 362. Further details relating to hardware suitable for the implementation of the present invention may be found in application Ser. No. 08/993,334, the disclosure of which is incorporated by reference herein for all purposes.

Because such program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Figure 4A:
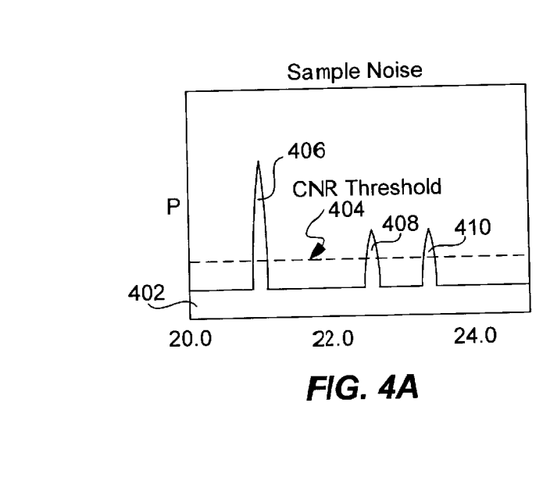
FIG. 4A–C and 5A–C are frequency band diagrams which illustrate the selection of the optimum frequency for data transmission in a network system utilizing cable modems in accordance with preferred embodiments of the present invention.
Figure 4B:
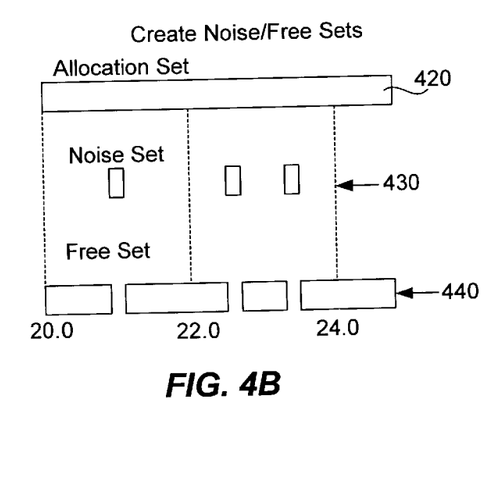
Figure 4C:
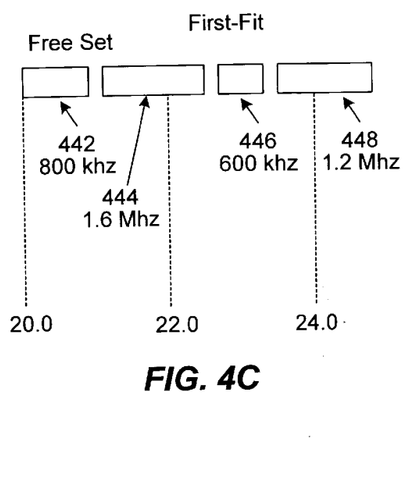

FIGS. 4A–C are frequency spectrum band diagrams which illustrate the selection of the optimum frequency for data transmission in a network system utilizing cable modems in accordance with a preferred embodiment of the present invention. In FIG. 4A, the noise power 402 for the available frequency bands ("allocation set") is sampled when there is no data transmission. In the example illustrated in FIG. 4A, the allocation set includes the frequency band from 20.0 to 24.0 MHz, as indicated on the x-axis. The y-axis represents signal power. The carrier-to-noise ratio (CNR) threshold, depicted as broken line 404, reflects the minimum CNR needed to successfully transmit using a particular modulation format (e.g., QPSK or QAM-16). In terms of power, if the transmit power in 0 dBmV, the power threshold is typically –15 dBmV for the QPSK modulation format, and –25 dBmV for the QAM-16 format. In the example illustrated in FIG. 4A, three narrowband ingress noise peaks 406, 408, 410, may be seen to exceed the CNR (power) threshold 404. These narrowband ingress noise peaks 406, 408 and 410 constitute a "noise set" and effectively divide the allocation set into four noise-free bands, the "free set."

This is further illustrated in FIG. 4B. The span of the allocation set 420 may be divided into fixed size quanta, each having a single noise measurement. If the magnitude of the noise for a particular quanta exceeds the CNR threshold 404, the quanta is considered noise and is identified as part of the noise set 430. The free set 440, may then be determined by computing the set difference between the allocation set 420 and the noise set 430.

In order to select one of these free set bands for a particular upstream data transmission, a first-fit process may be performed. In a preferred embodiment, a first-fit process involves a determination of whether or not a given band in the free set has sufficient width to accommodate a selected channel width (which may be referred to as the "start channel width") for the data to be transmitted, for example, the maximum channel width for a given modulation format. If not, the determination is made with respect to another band in the free set until a band sufficiently wide to accommodate the transmit data channel width has been located, or a negative determination has been made for all of the bands in the free set. Where a negative determination is made for all bands of the free set for the initially selected channel width, the next largest channel width for that format is selected and the determination procedure is repeated. The first sufficiently wide band that is located is assigned to the upstream data transmission, ending the first-fit process in success. If no band in the free set is wide enough to accommodate the narrowest allowable channel width (which may be referred to as the "stop channel width") for a given format (i.e., the narrowest channel with the capacity for the data to be transmitted) the first-fit process ends in failure.

As illustrated in FIG. 4C, in this example the four free set bands 442, 444, 446 and 448 have widths of 800 kHz, 1.6 MHz, 600 kHz and 1.2 MHz, respectively. The range of channel capacities for the QAM-16 and QPSK modulation formats is illustrated in Table 2, below; 10.24 to 0.64 Megabits per second (Mpbs) and 5.12 to 0.32 Mbps, respectively. The maximum and minimum channel widths in both cases are 3.2 MHz and 200 kHz, respectively. If, for the purposes of the first-fit process, the maximum and minimum channel widths are selected as the start channel width and stop channel width, the first-fit process will not locate a band sufficient to accommodate the start channel width. The next largest channel width in either format, 1.6 MHz, is then selected. This channel width may be accommodated by band 444 of the free set, ending the first-fit process in success by the assignment of the upstream data transmission channel to that frequency band.

TABLE 2

| Channel Capacity | QAM-16 Modulation | QPSK Modulation |
| --- | --- | --- |
| 10.24 Mbps | 3.2 MHz | not available |
| 5.12 Mbps | 1.6 MHz | 3.2 MHz |
| 2.56 Mbps | 0.8 MHz | 1.6 MHz |
| 1.28 Mbps | 0.4 MHz | 0.8 MHz |
| 0.64 Mbps | 0.2 MHz | 0.4 MHz |
| 0.32 Mbps | not available | 0.2 MHz |

Figure 5A:
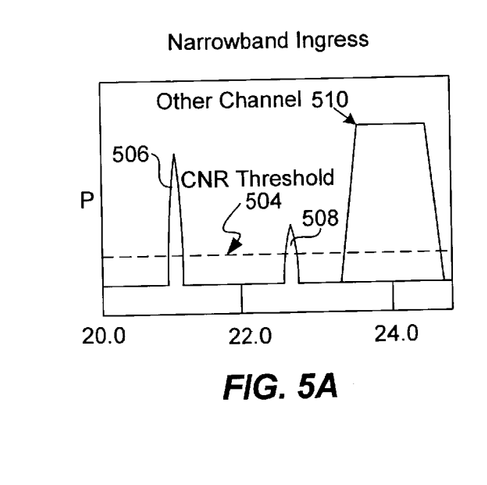
Figure 5B:
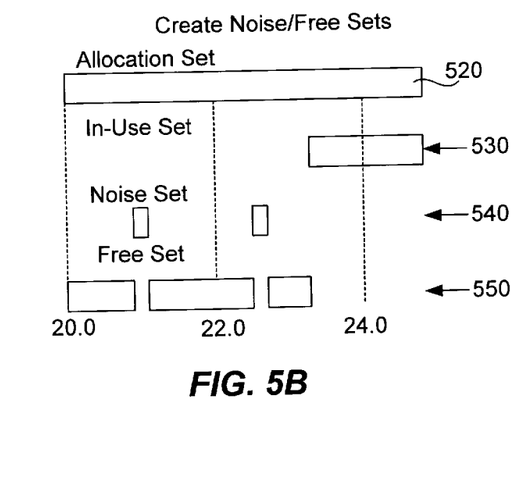
Figure 5C:
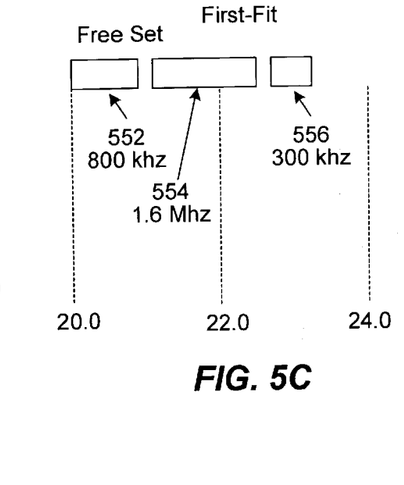

FIGS. 5A–C illustrate the selection of the optimum frequency for data transmission in a network system utilizing cable modems in accordance with preferred 5 embodiments of the present invention where the allocation set includes other channels already. In the example illustrated in FIG. 5A, the allocation set again includes the frequency band from 20.0 to 24.0 MHz. The CNR threshold is depicted as broken line 504. Two narrowband ingress noise peaks 506 and 508 may be seen to exceed the CNR (power) threshold 504. These narrowband ingress noise peaks 506 and 508 constitute the noise set for this example. In addition to the noise peaks, the allocation set also includes a channel 510 which is in use for transmission of other data; this channel makes up an "in-use set" (bands in use by other channels). In this embodiment, the free set is the allocation set less the noise set and the in-use set.

This is further illustrated in FIG. 5B. The in-use set 530 may be subtracted from the allocation set 520. The remaining span of the allocation set 520 may again be divided into fixed size quanta, each having a single noise measurement. If the magnitude of the noise for a particular quanta exceeds the CNR threshold 504, the quanta is considered noise and is identified as part of the noise set 540. The free set 550, may then be determined by computing the set difference between the allocation set 520 and the combination of the in-use and noise sets 530 ad 540, respectively. As illustrated in FIG. 5C, in this example the three free set bands 552, 554 and 556 have widths of 800 kHz, 1.6 MHz and 300 kHz, respectively. First-fit may be conducted with this free set as described previously with reference to FIG. 4C.

Figure 6:
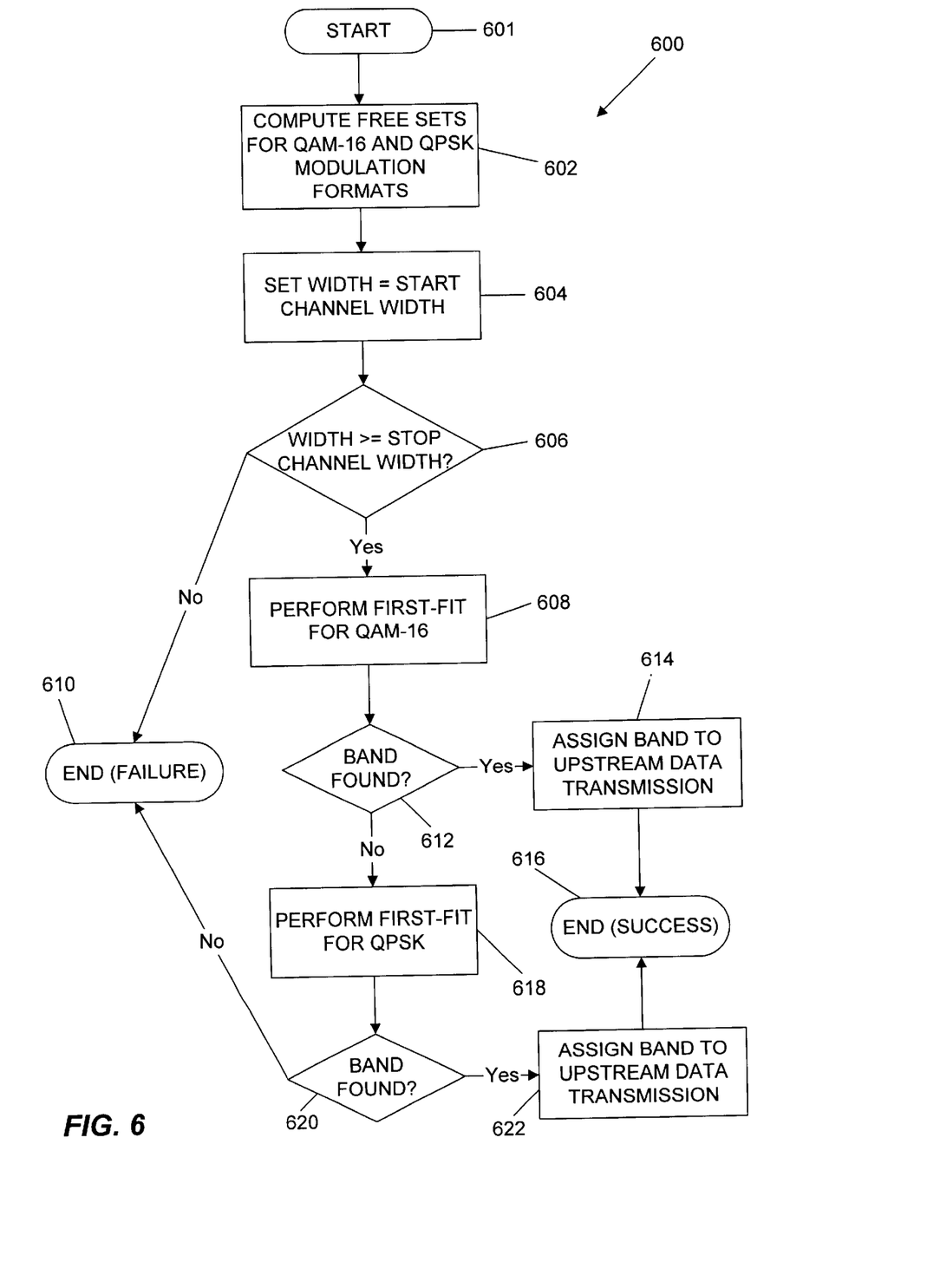
FIG. 6 is a process flow diagram showing steps in the selection of the optimum frequency for data transmission in a network system utilizing cable modems in accordance with a,preferred embodiment of the present invention.

FIG. 6 is a process flow diagram showing steps in the selection of the optimum frequency for data transmission in a network system utilizing cable modems in accordance with a preferred embodiment of the present invention in which the use of QAM-16 or QPSK modulation formats is contemplated. The process 600 begins at 601, and at a step 602 free sets are computed for QAM-16 and QPSK modulation formats. A process for computing a free set in accordance with the present invention is described above and below with reference to FIG. 7. At a step 604, a width variable is set to a selected start channel width. If the start channel width is greater-than-or-equal-to the stop channel width (preferably the minimum channel width with capacity for the upstream data transmission channel), the decision step 606 is answered in the affirmative and a first-fit process is performed for the QAM-16 modulation format at a step 608. A first-fit process in accordance with the present invention is described above and below with reference to FIG. 8. If the decision step 606 is answered in the negative, the process 600 ends in failure at a step 610, that is, the process is unable to locate a band from those in the free set which has sufficient capacity to accommodate the upstream data transmission channel, in this case because the start channel width is too narrow.

If the first-fit process is successful in locating a band from those in the QAM-16 free set which has sufficient capacity to accommodate the upstream data transmission channel, the decision step 612 is answered in the affirmative and the located band is assigned to transmission of the upstream data using modulation format QAM-16 at a step 614. The process then ends in success at 616.

If the first-fit process is unsuccessful in locating a band from those in the QAM-16 free set which has sufficient capacity to accommodate the upstream data transmission, the decision step 612 is answered in the negative and a first-fit process is performed for the QPSK modulation format at a step 618. If the decision step 620 is answered in the negative, the process 600 ends in failure at a step 610, because the process is unable to locate a band from those in the free set of either modulation format which has sufficient capacity to accommodate the upstream data transmission channel. If the decision step 620 is answered in the affirmative, the located band is assigned to transmission of the upstream data channel using modulation format QPSK at a step 622. The process then ends in success at 616.

Figure 7:
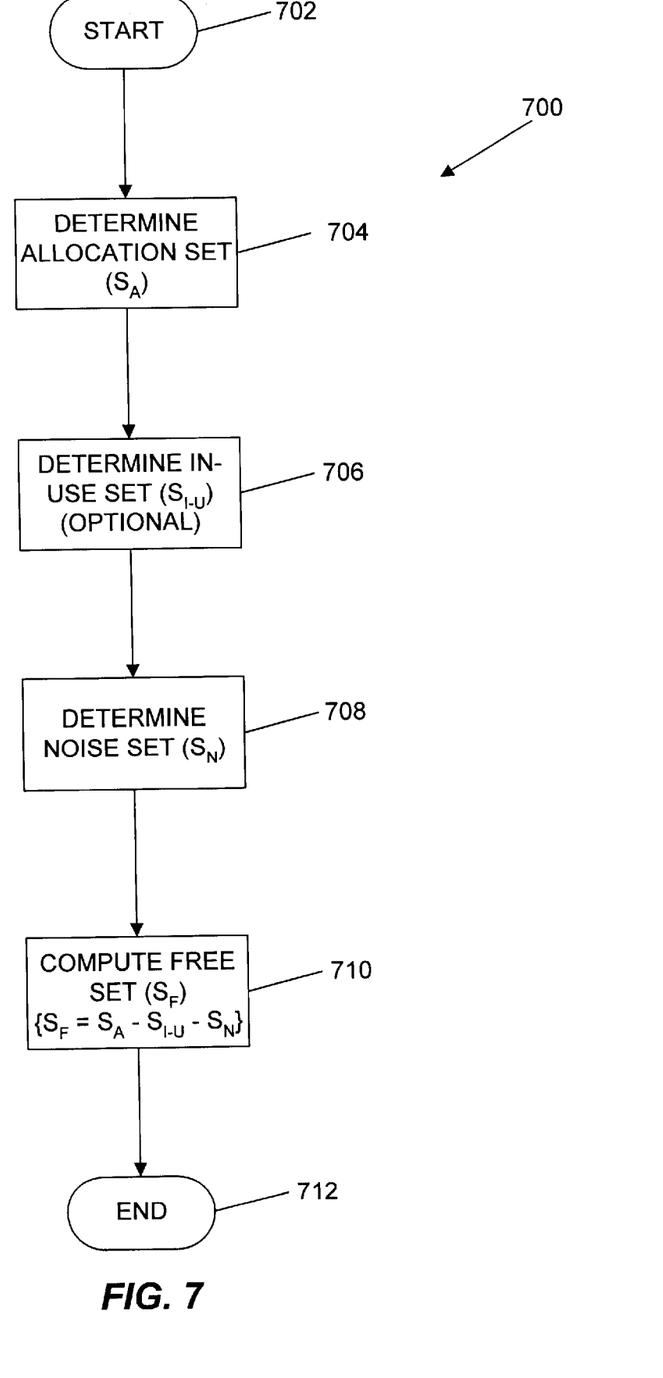
FIG. 7 is a process flow diagram showing steps in the determination of a free set of frequency bands from which the optimum frequency for data transmission in a network system utilizing cable modems is selected in accordance with a preferred embodiment of the present invention.

FIG. 7 is a process flow diagram showing steps in the determination of a free set of frequency bands from which the optimum frequency for data transmission in a network system utilizing cable modems is selected in accordance with a preferred embodiment of the present invention. The process 700 begins at 702, and at a step 704 the allocation set, $S_A$ (available frequency bands) for the particular modulation format (e.g., QAM-16 or QPSK) is determined. An in-use set, Slu (bands in use by other channels, if any) may optionally be determined at a step 706. At a step 708, the noise set, SN (narrowband ingress noise peaks which exceed the CNR threshold) is determined. The free set, $S_F$ (noise-free bands available for upstream data transmission) may then be computed by subtracting the noise set and the in-use set, if any, from the allocation set, at a step 710. The process ends at 712.

Figure 8:
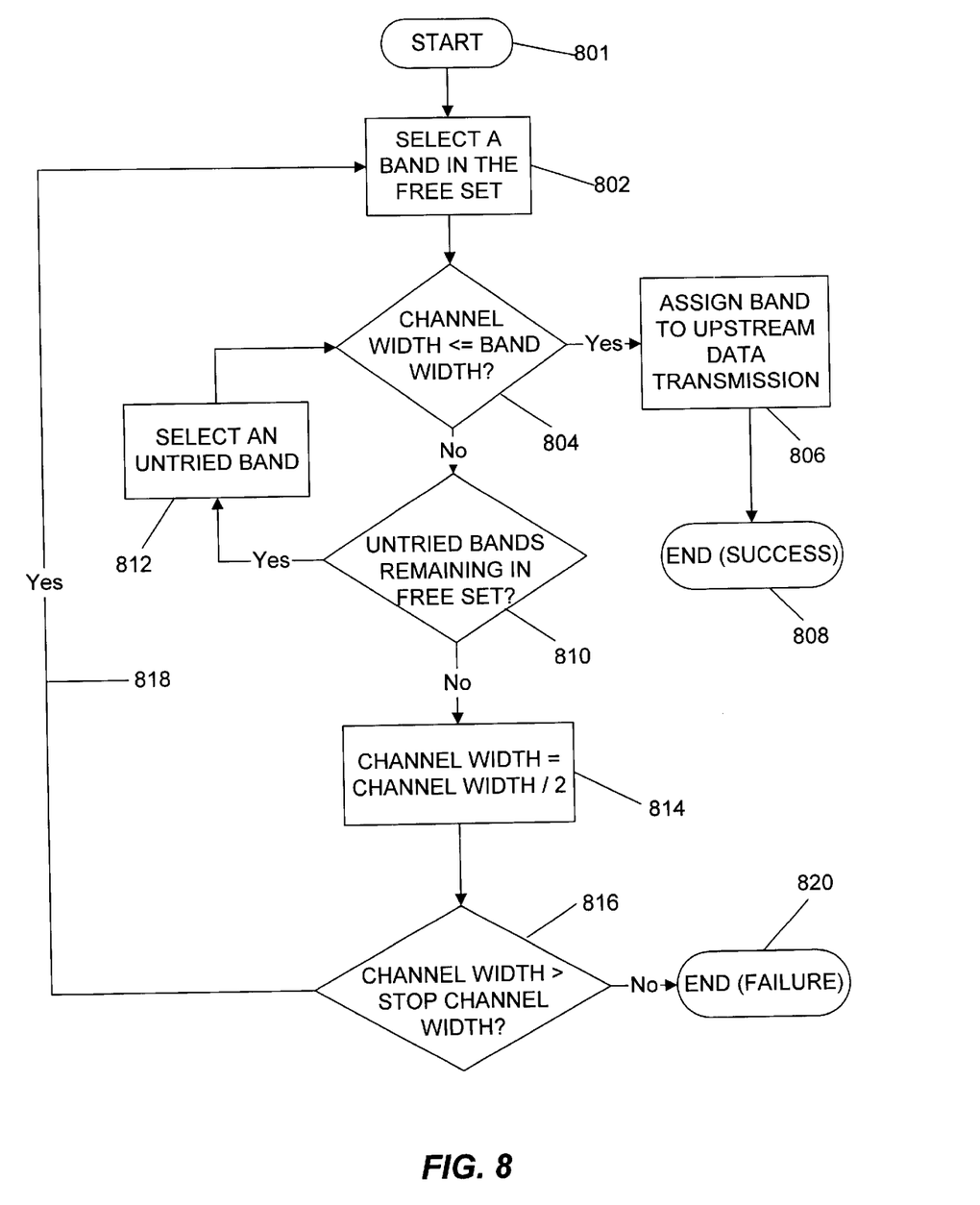
FIG. 8 is a process flow diagram showing steps in a first-fit process for selection of the optimum among the free set of frequency bands available for data transmission in a network system utilizing cable modems in accordance with a preferred embodiment of the present invention.

FIG. 8 is a process flow diagram showing steps in a first-fit process for selection of the optimum among the free set of frequency bands available for data transmission in a network system utilizing cable modems in accordance with a preferred embodiment of the present invention. The process begins at 801, and at a step 802 a band in the free set, for example the lowest frequency band, is selected. Then, at a decision step 804, it is determined whether or not the channel width for the data to be transmitted is less-than-or-equal-to the selected band width. If the decision step 804 is answered in the affirmative, the selected band is assigned to transmission of the upstream data channel at a step 806 and the process then ends in success at 808.

If decision step 804 is answered in the negative, it is determined whether or not there are any bands in the free set which have not yet been compared to the selected band width in the prior decision step 804 (untried bands) at decision step 810. If decision step 810 is answered in the affirmative, an untried band in the free set, for example the band having the next lowest frequency, is selected at a step 812, the process returns the prior decision step 804, and the flow proceeds.

If no band in the free set is wide enough to accommodate the channel width, decision step 810 will ultimately be answered in the negative. When this occurs, the channel width is halved at a step 814. If the new channel width is greater than the stop channel width, decision step 816 is answered in the affirmative, and the process returns to step 802, as illustrated by arrow 818, and the flow proceeds.

If no band in the free set is wide enough to accommodate the channel width when it is no longer greater than the stop channel width, decision step 814 will ultimately be answered in the negative. When this occurs, the process ends in failure at 820.

EXAMPLE

As noted above, the process of the present invention described herein is preferably implemented by computer software running at the headend of a network system utilizing cable modems. The following is an example of pseudo code for implementation of the present invention according to a preferred embodiment. This example is provided in order to further illustrate the invention as described herein and should not be construed to limit the invention.

The following input variables are configurable by the user.

Ulong: start_channel_width, stop_channel_width
Boolean: use_qpsk, use_qaml16

The following algorithm is used to maximize the channel capacity when choosing modulation and channel width. Start_channel_width should always be greater than stop_channel_width.

```
if(use_qpsk)
compute qpsk_free set;
if(use_qam16)
compute qam16_free_set;
for (width = start_channel_width; width >= stop_channel_
width: width /= 2) (
if (use_qam16)
band = first_fit (qam16_free_set, width);
if (band == NULL) {
if (use_qpsk)
band = first_fit (qpsk_free_set, width);
if(band ! = NULL) {
assign_upstream_band (band, width)
return SUCCESS;
}
}
}
return FAILURE;
```

Although the foregoing invention has been described in some detail for purposes of clarity of understanding, it will be apparent that certain changes and modifications may be practiced within the scope of the appended claims. It should be noted that there are many alternative ways of implementing both the process and apparatuses of the present invention. Accordingly, the present embodiments are to be considered as illustrative and not restrictive, and the invention is not to be limited to the details given herein, but may be modified within the scope and equivalents of the appended claims.

What is claimed is:

1. A method of selecting an upstream data transmission frequency band in a network system utilizing cable modems, comprising:

sampling noise power for a set of allocated upstream data transmission frequency bands when there is no data transmission;

determining a set of noise bands within the allocated frequency bands, said noise bands being bands in which noise exceeds a reliable transmission threshold for a modulation format;

determining a set of free bands within the allocated frequency bands, said free band set being the set difference of the allocated bands and the noise bands; and performing a first-fit on the free bands for a channel to be transmitted to select an upstream data transmission frequency band having capacity for the channel.

2. The method of claim 1, wherein said network system is a hybrid fiber coaxial cable television system.

3. The method of claim 1, further comprising determining a set of in-use bands within the allocated frequency bands, said in-use bands being bands already assigned to another channel, and wherein said set of free bands is the set difference of the allocated bands and the combination of noise bands and in-use band.

4. The method of claim 1, further comprising assigning the allocated band to upstream transmission of the channel.

5. The method of claim 1, wherein said modulation format is at least one of QAM-16 and QPSK.

6. The method of claim 5, wherein said first-fit is first performed for the QAM-16 modulation format.

7. The method of claim 1, wherein said first-fit is a process comprising:
    selecting a band in the free set;
    where a channel width attributed to an upstream data channel is less-than-or-equal-to the band width, assigning the band to upstream transmission of the channel.

8. The method of claim 7, further comprising, where a channel width attributed to an upstream data channel is greater than the band width, selecting an untried band from the free set for comparison to the channel width.

9. The method of claim 8, further comprising, where no untried bands remain in the free set, and the channel width is greater than a minimum channel width, halving the channel width and restarting the band selection and comparison from the free set.

10. A computer program product comprising a computer-usable medium having computer-readable program code embodied thereon relating to selecting an upstream data transmission frequency band in a network system utilizing cable modems, the computer-readable program code effecting the following steps within a computing system:
    sampling noise power for a set of allocated upstream data transmission frequency bands when there is no data transmission;
    determining a set of noise bands within the allocated frequency bands, said noise bands being bands in which noise exceeds a reliable transmission threshold for a modulation format;
    determining a set of free bands within the allocated frequency bands, said free band set being the set difference of the allocated bands and the noise bands; and
    performing a first-fit on the free bands for a channel to be transmitted to select an upstream data transmission frequency band having capacity for the channel.

11. The computer program product of claim 10, further comprising determining a set of in-use bands within the allocated frequency bands, said in-use bands being bands already assigned to another channel, and wherein said set of free bands is the set difference of the allocated bands and the combination of noise bands and in-use band.

12. The computer program product of claim 10, further comprising assigning the allocated band to upstream transmission of the channel.

13. The computer program product of claim 10, wherein said modulation format is at least one of QAM-16 and QPSK.

14. The computer program product of claim 12, wherein said first-fit is first performed for the QAM-16 modulation format.

15. The computer program product of claim 10, wherein said first-fit is a process comprising:
    selecting a band in the free set; and
    where a channel width attributed to an upstream data channel is less-than-or-equal-to the band width, assigning the band to upstream transmission of the channel.

16. The computer program product of claim 15, further comprising, where a channel width attributed to an upstream data channel is greater than the band width, selecting an untried band from the free set for comparison to the channel width.

17. The computer program product of claim 16, further comprising, where no untried bands remain in the free set, and the channel width is greater than a minimum channel width, halving the channel width and restarting the band selection and comparison from the free set.

18. The computer program product of claim 10, wherein the computer-usable medium comprises at least one of a magnetic medium, an optical medium, a hardware device specially configured to store and perform program instructions, and a carrier wave.

19. A network system utilizing cable modems capable of two-way transmission of data, comprising:
    a downstream data path to subscribers on the cable network system originating from a headend;
    a downstream modulator and transmitter for modulating and transmitting a downstream signal to be carried on the downstream data path to subscribers on the cable network system;
    an upstream data path to the headend originating from subscribers on the cable network system;
    an upstream demodulator and receiver in the headend for receiving and demodulating an upstream signal to be carried on the upstream data path;
    a spectrum analyzer for scanning an upstream frequency band; and
    an interface to a central processing unit;
    said spectrum analyzer capable of receiving computer program instructions via said interface for a method of selecting an upstream data transmission frequency band comprising the following steps,
        sampling noise power for a set of allocated upstream data transmission frequency bands when there is no data transmission,
        determining a set of noise bands within the allocated frequency bands, said noise bands being bands in which noise exceeds a reliable transmission threshold for a modulation format,
        determining a set of free bands within the allocated frequency bands, said free band set being the set difference of the allocated bands and the noise bands, and
        performing a first-fit on the free bands for a channel to be transmitted to select an upstream data transmission frequency band having capacity for the channel.

20. The cable network system of claim 19, wherein the upstream and downstream paths comprise a hybrid fiber coaxial cable television system.

21. The cable network system of claim 19, further comprising a cable modem for receiving data on the downstream data path and transmitting data on the upstream data path.

22. The cable network system of claim 19, wherein the headend contains a cable modem termination system.

23. The cable network system of claim 19, wherein the spectrum analyzer is coupled to the upstream data path within the headend.

24. The cable network system of claim 23, wherein the spectrum analyzer is coupled to the upstream data path within the cable modem termination system.

25. The cable network system of claim 19, wherein the spectrum analyzer is coupled to the upstream data path outside the headend.

26. The cable network system of claim 25, wherein the spectrum analyzer is coupled to the upstream data path at a subscriber location.

27. A cable television system headend, comprising:
a downstream transmitter for transmitting to subscriber destinations a downstream signal having a downstream frequency spectrum associated therewith;
an upstream demodulator and receiver for receiving and demodulating an upstream signal having an upstream frequency spectrum associated therewith;
a cable modem termination system,
said cable modem termination system comprising,
a spectrum analyzer for scanning an upstream frequency band, and
an interface to a central processing unit; and
said cable modem termination system capable of receiving and implementing computer program instructions via said interface for a method of selecting an upstream data transmission frequency band comprising the following steps,
sampling noise power for a set of allocated upstream data transmission frequency bands when there is no data transmission,
determining a set of noise bands within the allocated frequency bands, said noise bands being bands in which noise exceeds a reliable transmission threshold for a modulation format,
determining a set of free bands within the allocated frequency bands, said free band set being the set difference of the allocated bands and the noise bands, and
performing a first-fit on the free bands for a channel to be transmitted to select an upstream data transmission frequency band having capacity for the channel.

28. The headend of claim 27, wherein said interface is an interface card.

29. The cable network system of claim 19, wherein said first-fit comprises:
selecting a band in the free set;
where a channel width attributed to an upstream data channel is less-than-or-equal-to the band width, assigning the band to upstream transmission of the channel.

30. The cable network system of claim 29, further comprising, where a channel width attributed to an upstream data channel is greater than the band width, selecting an untried band from the free set for comparison to the channel width.

31. The cable network system of claim 30, further comprising, where no untried bands remain in the free set, and the channel width is greater than a minimum channel width, halving the channel width and restarting the band selection and comparison from the free set.

32. The headend of claim 27, wherein said first-fit comprises:
selecting a band in the free set;
where a channel width attributed to an upstream data channel is less-than-or-equal-to the band width, assigning the band to upstream transmission of the channel.

33. The headend of claim 32, further comprising, where a channel width attributed to an upstream data channel is greater than the band width, selecting an untried band from the free set for comparison to the channel width.

34. The headend of claim 33, further comprising, where no untried bands remain in the free set, and the channel width is greater than a minimum channel width, halving the channel width and restarting the band selection and comparison from the free set.

35. A network system utilizing cable modems capable of two-way transmission of data, comprising:
a downstream data path to subscribers on the cable network system originating from a headend;
a downstream modulator and transmitter for modulating and transmitting a downstream signal to be carried on the downstream path to subscribers on the cable network system;
an upstream data path to the headend originating from subscribers on the cable network system;
an upstream demodulator and receiver in the headend for receiving and demodulating an upstream signal to be carried on the upstream data path;
means for performing a first-fit on a set of noise-free frequency bands in a set of allocated bands to select a noise-free band available for upstream data transmission.

36. The cable network system of claim 35, wherein said first-fit comprises:
selecting a band in the free set;
where a channel width attributed to an upstream data channel is less-than-or-equal-to the band width, assigning the band to upstream transmission of the channel.

37. The cable network system of claim 36, further comprising, where a channel width attributed to an upstream data channel is greater than the band width, selecting an untried band from the free set for comparison to the channel width.

38. The cable network system of claim 37, further comprising, where no untried bands remain in the free set, and the channel width is greater than a minimum channel width, halving the channel width and restarting the band selection and comparison from the free set.

* * * * *